United States Patent
Marciano et al.

(10) Patent No.: US 10,796,051 B1
(45) Date of Patent: Oct. 6, 2020

(54) ADAPTIVE MODEL INTERFACE FOR A PLURALITY OF EDA PROGRAMS

(71) Applicant: Cadence Design Systems, Inc., San Jose, CA (US)

(72) Inventors: Abner Luis Panho Marciano, Belo Horizonte (BR); Matheus Fonseca, Betum (BR); Thamara Karen Cunha Andrade, Ituna (BR); Raquel Lara dos Santos Pereira, Belo Horizonte (BR); Fabiano Cruz Peixoto, Belo Horizonte (BR); Rodolfo Santos Teixeira, Belo Horizonte (BR); Rafael Gontijo Hamdan, Belo Horizonte (BR); Bruno Andrade Pereira, Belo Horizonte (BR)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/399,536

(22) Filed: Apr. 30, 2019

(51) Int. Cl.
| | |
|---|---|
| G06F 30/00 | (2020.01) |
| G06F 30/3323 | (2020.01) |
| G06F 30/3312 | (2020.01) |
| G06F 111/04 | (2020.01) |
| G06F 111/20 | (2020.01) |

(52) U.S. Cl.
CPC ...... *G06F 30/3323* (2020.01); *G06F 30/3312* (2020.01); *G06F 2111/04* (2020.01); *G06F 2111/20* (2020.01)

(58) Field of Classification Search
CPC .............. G06F 30/327; G06F 30/3323; G06F 2111/04; G06F 2111/20
See application file for complete search history.

(56) References Cited

U.S. PATENT DOCUMENTS

| | | | | |
|---|---|---|---|---|
| 5,801,958 | A * | 9/1998 | Dangelo | G01R 31/31835 716/102 |
| 5,907,698 | A * | 5/1999 | Kucukcakar | G06F 30/30 716/104 |
| 7,089,517 | B2 * | 8/2006 | Yamoto | G01R 31/31831 716/108 |
| 7,441,210 | B2 * | 10/2008 | Lahner | G06F 30/30 716/104 |
| 7,937,673 | B1 * | 5/2011 | Kurshan | G06F 30/3323 716/102 |
| 8,020,124 | B2 * | 9/2011 | Alexanian | G01R 31/31831 716/106 |
| 8,032,846 | B1 | 10/2011 | Balasubramanian et al. | |
| 8,391,421 | B2 | 3/2013 | Lee et al. | |
| 8,584,062 | B2 * | 11/2013 | Xia | G06F 8/43 716/101 |
| 8,904,319 | B2 | 12/2014 | Bist et al. | |

(Continued)

*Primary Examiner* — Naum Levin
(74) *Attorney, Agent, or Firm* — Tarolli, Sundheim, Covell & Tummino LLP

(57) ABSTRACT

In the described examples, a model impact monitor can include an electronic design automation (EDA) manager that communicates with a plurality of EDA programs, wherein each EDA program generates a model set for a register-transfer level (RTL) design comprising a list of RTL operations. The model impact monitor can also include an adaptive model interface that records changes to the RTL operations of the RTL design and measures a change in performance characteristics of each of the plurality of EDA programs based on a respective one of the changes in the RTL operations of the RTL design.

20 Claims, 14 Drawing Sheets

(56) References Cited

U.S. PATENT DOCUMENTS

| | | | |
|---|---|---|---|
| 9,047,427 B1* | 6/2015 | Doucet | G06F 30/398 |
| 9,201,994 B1* | 12/2015 | Tripathi | G06F 30/30 |
| 9,817,929 B1* | 11/2017 | Chauhan | G06F 30/3323 |
| 10,114,916 B1* | 10/2018 | Argollo | G06F 16/16 |
| 10,235,485 B1* | 3/2019 | Iyer | G06F 30/34 |
| 10,586,004 B2* | 3/2020 | Sinnadurai | G06F 30/327 |
| 2004/0098689 A1* | 5/2004 | Weed | G06F 30/30 716/102 |
| 2007/0083839 A1* | 4/2007 | Lahner | G06F 30/30 716/139 |
| 2008/0071514 A1* | 3/2008 | Yuri | G06F 30/33 703/15 |
| 2009/0293028 A1* | 11/2009 | Hiraoglu | G06F 30/3323 716/106 |
| 2011/0184714 A1* | 7/2011 | Zhang | G06F 30/33 703/13 |
| 2014/0229902 A1 | 8/2014 | Yu-Tseng et al. | |
| 2017/0103298 A1* | 4/2017 | Ling | G06N 3/063 |
| 2017/0103299 A1* | 4/2017 | Aydonat | G06N 3/063 |
| 2018/0268096 A1* | 9/2018 | Chuang | G06F 30/27 |
| 2018/0357433 A1 | 12/2018 | Kalafala et al. | |

* cited by examiner

ADAPTIVE MODEL INTERFACE FOR A PLURALITY OF EDA PROGRAMS

TECHNICAL FIELD

This disclosure relates to electronic design automation (EDA) programs. More particularly, this disclosure relates to an adaptive model interface for the EDA programs.

BACKGROUND

Electronic design automation (EDA), also referred to as electronic computer-aided design (ECAD), is a category of software programs for designing electronic systems such as integrated circuits and printed circuit boards. The programs work together in a design flow that chip designers use to design and analyze entire semiconductor chips. Since a modern semiconductor chip can have billions of components, EDA programs are essential for their design. As one example, EDA programs can include logic synthesis, logic simulation and formal verification.

Logic synthesis is a process by which an abstract specification of desired circuit behavior, typically at the register-transfer level (RTL), is turned into a design implementation in terms of logic gates, typically by a computer program called a synthesis tool (a particular EDA program). Common examples of this process include synthesis of designs specified in hardware description languages, including VHDL and Verilog. Some synthesis tools generate bitstreams for programmable logic devices such as program array logic (PAL) devices or field programmable gate arrays (FPGAs), while others target the creation of application specific integrated circuits (ASICs).

Logic simulation is the use of simulation software (another EDA program) to predict the behavior of digital circuits and hardware description languages. Simulation can be performed at varying degrees of physical abstraction, such as at the transistor level, gate level, the RTL, electronic system-level (ESL), or behavioral level.

Formal verification is the use of formal verification software (yet another EDA program) to execute the task of verifying that the logic design conforms to specification. This is a complex task, and takes the majority of time and effort in most large electronic system design projects.

SUMMARY

One example relates to a non-transitory machine readable medium having machine readable instructions, the machine readable instructions including a model impact monitor. The model impact monitor can include an electronic design automation (EDA) manager that communicates with a plurality of EDA programs, wherein each EDA program generates a model set for a register-transfer level (RTL) design having a list of RTL operations. The model impact monitor can also include an adaptive model interface that records changes to the RTL operations of the RTL design and measures a change in performance characteristics of each of the model sets generated by the plurality of EDA programs based on a respective one of the changes in the RTL operations of the RTL design.

Another example relates to a method that can include generating, by each of a plurality of EDA programs with an RTL design having a list of RTL operations, a respective model set for the RTL design. The method can also include selecting a structure in a given model of a given model set generated by a given EDA program of the plurality of EDA programs that potentially leads to an inefficient circuit design. The method can further include identifying a current set of RTL operations in the RTL design that corresponds to the selected structure. The method can yet further include changing the current set of RTL operations to an updated set of RTL operations and providing the plurality of programs with the RTL design comprising the updated set of RTL operations, wherein each EDA program generates an updated model set for the RTL design. The method can also include measuring performance characteristics of each of the updated model set for the RTL design to determine an impact of the changing.

Yet another example relates to a system that can include a non-transitory memory to store machine readable instructions and a processor to access the memory and execute the machine readable instructions. The machine readable instructions can include a plurality of EDA programs, wherein each EDA program generates a model set for an RTL design having a list of RTL operations and each model set generated by a respective one of the plurality of EDA programs represent the operations of the RTL design differently. The machine readable instructions can also include an EDA manager that communicates with the plurality of EDA programs. The machine readable instructions can further include an adaptive model interface an adaptive model interface that records changes to one or more of the RTL operations of the RTL design and a given model in the model sets and measures a change in performance characteristics of each of the model sets based on updates to the model sets generated by the plurality of EDA programs that are made in response to either a respective one of the changes in the RTL operations of the RTL design or a respective one of the changes to the given model in the model sets.

DETAILED DESCRIPTION

This disclosure relates to a model impact monitor that communicates with a plurality of different electronic design automation (EDA) programs that generate a model set for a common register-transfer level (RTL) design. Each EDA program may be programmed to represent RTL operations differently. Accordingly, the model set generated by each EDA program may be different even though each model set represents the same RTL design.

Problems arise when one of the EDA programs is employed to tune (e.g., optimize) the corresponding model set without regard to the impact on the other model sets. For instance, if a particular EDA program is employed to make changes to the RTL design, those changes result in a change to every model set, not just the model set of the particular EDA program, and some of these changes may negatively impact performance of a different model set. To avoid such problems, the model impact monitor is configured to monitor and record any such changes to the RTL design and output performance metrics that are employable to track the impact of performance on each such change to the RTL design. In this manner, the impact that changes to the RTL design have on each model set can be observed, allowing a user of the model impact monitor to ensure that the changes to the RTL design that are made do not have an overly negative impact on one or more of the model sets generated by the EDA programs.

Figure 1:
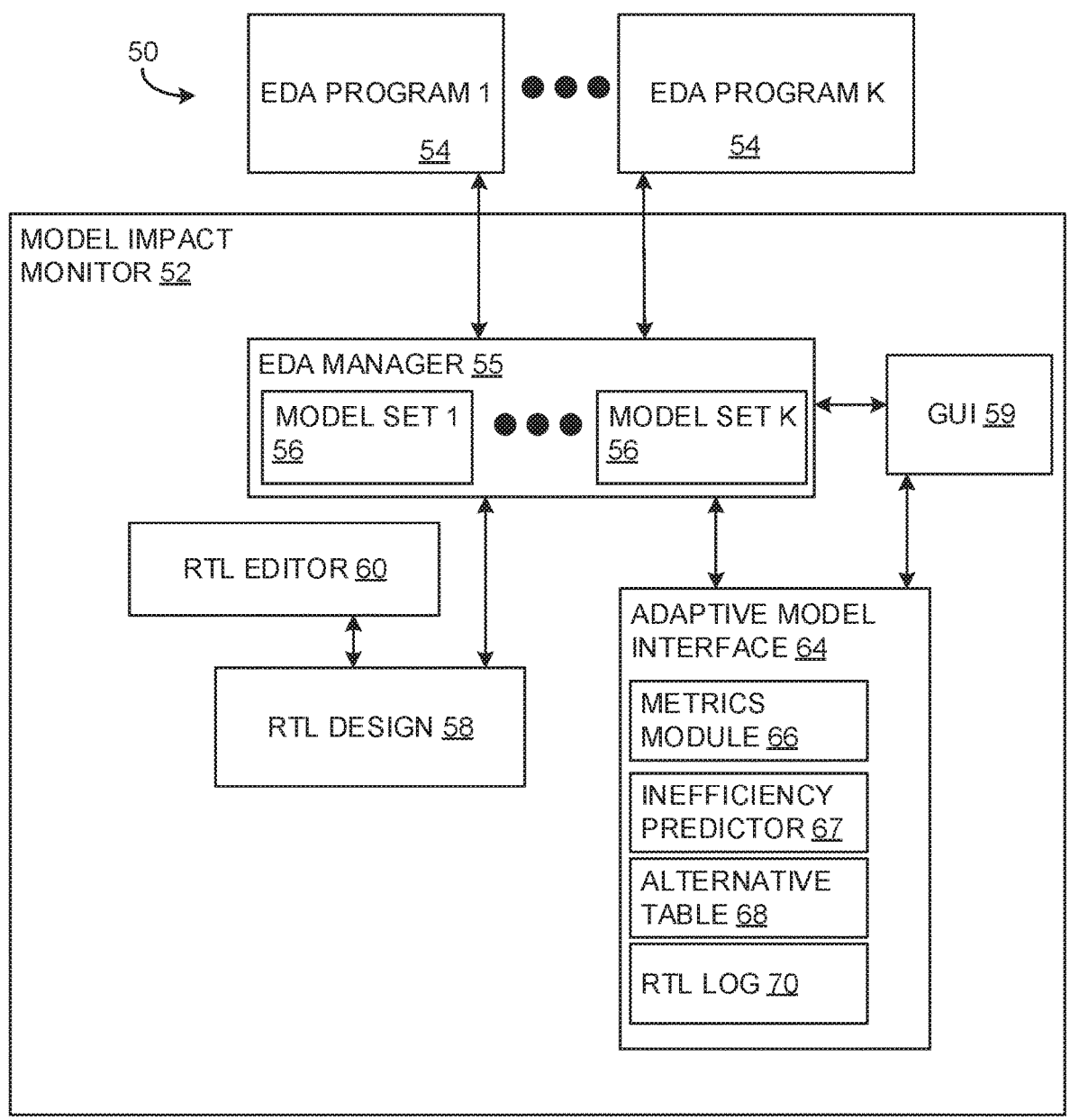
FIG. 1 illustrates an example of a system for monitoring the impact of changes to a register-transfer level (RTL) design.

FIG. 1 illustrates an example of a system 50 for implementing a model impact monitor 52. The model impact monitor 52 can be implemented as a software component executing on a computing platform. The model impact monitor 52 communicates with K number of electronic design automation (EDA) programs 54, where K is an integer greater than or equal to two. In some examples, the K number of EDA programs 54 and the model impact monitor 52 can be implemented on the same computing platform. In other examples, the K number of EDA programs 54 and the model impact monitor 52 can be implemented on different computing platforms that communicate via a network, such as a local area network and/or a public network (e.g., the Internet).

The model impact monitor 52 can include an EDA manager 55 that communicates with each of the K number of EDA programs 54. Each of the K number of EDA programs 54 can employ a local engine to generate a model set 56 that includes one or more models of a register-transfer level (RTL) design 58 for a circuit, such as an integrated circuit (IC) or a plurality of ICs. The RTL design 58 includes a list of RTL operations (e.g., sequential logic and/or combinational logic) for implementing the circuit. In some examples, the RTL design 58 can be generated by compiling a hardware description language (HDL) file characterizing the circuit.

For purposes of simplification of explanation, each model set 56 is numbered to match a respective EDA program 54. Thus, it is presumed that model set 1 is generated by EDA program 1. In some examples, each model set 56 can be stored by the EDA manager 55. In other examples, each model set 56 is stored locally with the computing platform executing the respective EDA program 54.

Figure 2:
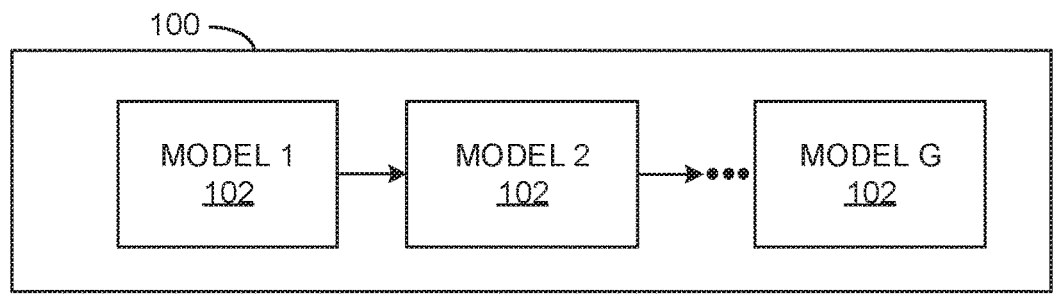
FIG. 2 illustrates an example of a model set generated by an electronic design automation (EDA) program.

FIG. 2 illustrates an example of a model set 100 that is employable for each of the K number of model sets 56 of FIG. 1. The model set 100 includes G number of models 102 arranged in series, where G is an integer greater than or equal to one. Each of the G number of models 102 is implemented as a set of mathematical operations with parameters for simulating operations of a physical circuit (e.g., a "real world circuit"), such as a circuit represented by the RTL design 58 of FIG. 1.

Each model 102 represents a different level of abstraction, wherein a subsequent level of the series represents a lower level of abstraction. Accordingly, a first model 102 (model 1) represents a higher level of abstraction than a second model 102 (model 2). As one example, the first model 102 may be implemented as a pure mathematical abstraction, the second model 102 may be implemented as a gate level design and a final model 102 (model G) may be implemented as an unrolled logic operation or a netlist. As used herein, the term "upstream" relative to a given model 102 denotes each model in the G number of models with a higher level of abstraction. As an example, the first model 102 and the second model 102 are upstream relative to the final model 102.

Referring back to FIG. 1, each of the K number of model sets 56 generated by each of the respective K number of EDA programs 54 represents the RTL design 58 differently. Moreover, each level of abstraction of each of the model sets 56 may not match. For instance, a first level of a first model set 56 (model set 1) may have a level of abstraction that is lower than a first level of the final model set 56 (model set K).

The model impact monitor 52 can further include an RTL editor 60. The RTL editor 60 allows edits to the RTL design 58 or in some examples, to one or more of the models in the K number of model sets 56. Additionally or alternatively, each of the K number of EDA programs 54 (or some subset thereof) can include tools for editing the RTL design 58 via the EDA manager 55. In situations where the RTL design 58 is updated (or otherwise changed), each of the K number of EDA programs 54 provides an updated model set 56. In some examples, an interface for the RTL editor 60 can be output via a graphical user interface (GUI) 59 that is output and controlled by the model impact monitor 52. In other examples, the RTL editor 60 can be a software interface that allows each of the K number of EDA programs 54 to edit the RTL design 58.

The model impact monitor 52 can include an adaptive model interface 64. The adaptive model interface 64 can record changes to the RTL operations of the RTL design 58 and measure a change in performance characteristics of each of the K number of model sets 56 based on the changes to the RTL operations of the RTL design 58. Moreover, the adaptive model interface 64 includes tools for identifying potential inefficiencies in the RTL design 58, providing alternative operations and monitoring the impact of changes to the RTL design 58, as explained herein.

More particularly, the adaptive model interface 64 can include a metrics module 66 that measures and records performance characteristics of each of the K number of model sets 56. Such performance characteristics can include a proof time and a memory usage for each model in the K sets of models. Thus, in the example illustrated in FIG. 2, the metrics module 66 could record a proof time and a memory usage for each of the G number of models 102. In some examples, the performance characteristics can be output on the metrics window (e.g., a web page) of the GUI 59 that is output by the model impact monitor 52. The GUI 59 can include user selectable features for controlling the model impact monitor 52.

Evaluation of the performance characteristics can reveal potential inefficacies in one or more models in the K number of model sets 56. More particularly, in some examples, the performance characteristics for a given model of a given model set 56 may be unacceptable. In such a situation, a user of the model impact monitor 52 may desire to improve the performance characteristics to ultimately improve the operation of a resulting circuit. Accordingly, the user can employ the GUI 59 to set a goal performance characteristic (e.g., a goal proof time and/or memory usage) for the given model of the given model set 56. In some such examples, the GUI 59 can provide a view of an overall system flow.

The adaptive model interface 64 can include an inefficiency predictor 67 that identifies structures within the models of the K number of model sets 56 that have such potential inefficiencies. In other examples, the inefficiency predictor 67 can be implemented on an external system, such as but not limited to each of the K number of EDA programs 54, or some subset thereof. Alternatively, a user viewing the metrics window of the GUI 59 can identify particular models of the K number of model sets 56 that have potentially inefficient structures.

Upon identifying a particular inefficient structure, in some examples the GUI 59 enables selection of a structure in one of the model sets 56 that potentially leads to inefficient circuit design. In some examples, in response to selection of the structure, the adaptive model interface 64 executes a back propagation operation to identify a current set of RTL operations in the RTL design 58 that are the root cause of the selected structure. Stated differently, the adaptive model interface 64 identifies the current set of RTL operations in the RTL design 58 that resulted in the selected structure. Such back propagation operation also identifies structures related to the selected structure in models that are upstream of the selected model that are within the same model set 56. For instance, in FIG. 2 if the selected structure is within the second model 102 (model 2), the adaptive model interface 64 identifies a structure (or multiple structures) in the first model 102 (model 1) that corresponds to the selected structure.

In other examples, the back propagation operation identifies a set of structures in a model upstream of the selected structure, but downstream from the RTL design 58 that is determined to be a cause of the selected structure. In such situations, in examples where the model upstream from the selected structure is shared with another model set 56, changes to the upstream model are propagated downstream to each model set that shares the model upstream of the selected structure in a manner described herein.

Upon identifying the set of operations in the RTL design 58 or the set of structures in the upstream model that caused the selected structure, the adaptive model interface 64 parses each model in the other of the K number of model sets 56 to identify structures related to the selected structure within the models of the K number of model sets 56 that represent the same set of RTL operations in the RTL design 58 or the structure in the upstream model. Upon identifying such related structures, the RTL design 58 can be modified to replace the current set of RTL operations that caused the selected structure with an updated set of RTL operations that have an equivalent operation for the purposes of a circuit characterized by the RTL design 58. In some examples, the RTL editor 60 can be employed to edit the RTL design 58. In such a situation, the adaptive model interface 64 can output data from an alternative operations table 68 that identifies RTL operations equivalent to the current set of RTL operations for the purposes of the circuit characterized by the RTL design 58. In other examples, the EDA program 54 that generated the selected structure is employable to modify the RTL design 58.

The adaptive model interface 64 can include an RTL log 70 that records changes to the RTL design 58. More particularly, the RTL log 70 includes data sufficient to revert the RTL design 58 to a state that included the previous set of RTL operations (referred to as the "current set of RTL operations") in a roll-back operation.

The K number of EDA programs 54 can forward propagate the changes to the RTL design 58 and the adaptive model interface 64 can track an impact of the changes. More specifically, in response to modification of the RTL design 58, the EDA manager 55 can forward the modified RTL design 58 to each of the K number of EDA programs 54. In response, each of the K number of EDA programs 54 can update a respective model set 56 to provide K number of updated model sets 56. The metrics module 66 of the adaptive model interface 64 can measure and record updated performance characteristics for each of the updated model sets 56. In some situations, the performance characteristics improve for every model of the K number of model sets 56. In other situations, the updated performance characteristics worsen for every model of the K number of model sets 56. In still other examples, some models of the K number of model sets 56 have improved performance characteristics, some models have worsened performance characteristics and some models have the same performance characteristics (e.g., no impact).

The metrics module 66 can compare the updated performance characteristics to the previous performance characteristics to identify changes in the performance characteristic of each model in each model set 56. The model impact monitor 52 can output the changes in the performance characteristics in the metrics window of the GUI 59. Upon evaluating the change in performance characteristics, the user of the model impact monitor 52 may desire to accept the update to the RTL design 58, such that the next (if any) potentially inefficient structure of a model can be identified and rectified. Alternatively, if the user of the model impact monitor 52 is dissatisfied with the change, the user can select a revert selectable element in the GUI 59. In response to actuation of the revert selectable element, the adaptive model interface 64 can revert the RTL design 58 to the previous state based on information stored in the RTL log 70.

As noted, each of the K number of EDA programs 54 can generate models for the respective model set 56 that represent the RTL design differently 58. In fact, in many situations, one model set 56 may more accurately represent a particular RTL operation than another model set 56. By employment of the system 50, the user of the model impact monitor 52 can actively track the impact of changes to the RTL design 58 on each of the resulting model sets 56. Thus, the user of any one of the EDA programs 54 can be informed of the impact that changing a set of RTL operations has on the model sets generated by every other EDA program 54.

The features of the system 50 may be better appreciated with respect to some examples. Thus, FIGS. 3-14 depict different states for a diagram 200 explaining examples of possible operational flows of the system 50. For purposes of simplification of explanation, FIGS. 1-14 employ the same reference number to denote the same structures. Moreover, some features in FIGS. 3-14 are not re-introduced for each individual diagram. Each state of the diagram 200 (or some subset thereof) can be representative of a possible output of the GUI 59 of FIG. 1.

Figure 3:
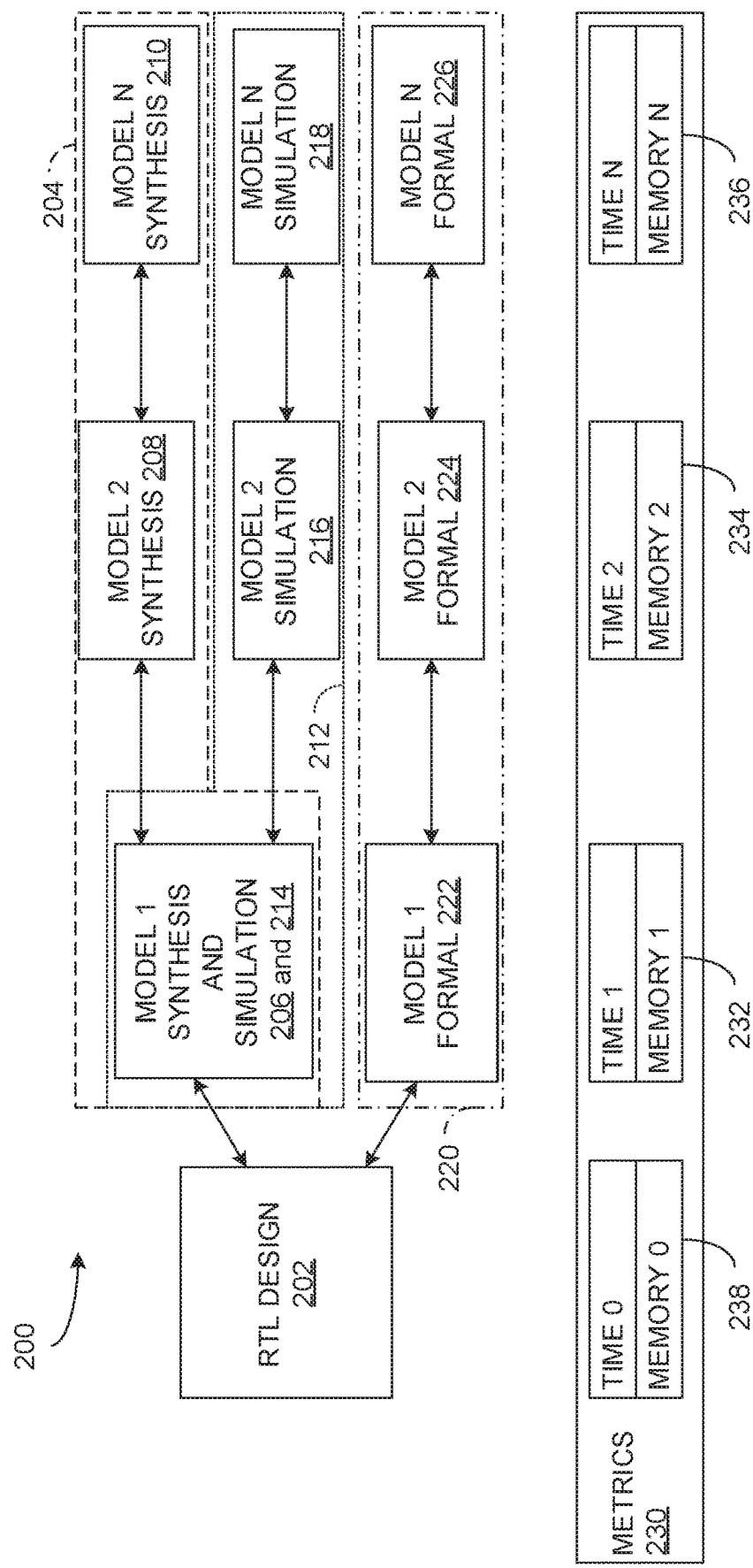
FIG. 3 illustrates an overall diagram for possible operational flows of a system for monitoring the impact of changes to an RTL design.

The diagram 200 illustrated in FIG. 3 depicts the overall relationship between features of the diagrams illustrated in FIGS. 3-14. In the diagram 200, it is presumed that there are three different model sets generated by three different EDA programs (corresponding to the K number of EDA programs 54 of FIG. 1) based on an RTL design 202. The RTL design 202 can be employed to implement the RTL design 58 of FIG. 1.

A first EDA program (corresponding to one of the EDA programs 54 of FIG. 1) is implemented as a hardware synthesis EDA program that generates a synthesis model set 204 (e.g., a first model set). The synthesis model set 204 includes N number of models where N is an integer greater than one. For purposes of simplification of explanation, N is illustrated as being set to three in the diagram 200. However, in other examples, there could be more or less than three models. Thus, the synthesis model set 204 includes a first model (model 1) 206, a second model (model 2) 208 and an Nth model (model N) 210. One or more of the first model 206, the second model 208 and the third model 210 of the synthesis model set 204 can define logic elements for the RTL design 202.

A second EDA program (corresponding to one of the EDA programs 54 of FIG. 1) is implemented as a simulator EDA program that generates a simulator model set 212 (a second model set) with N number of models. The simulator model set 212 includes a first model 214, a second model 216 and an Nth model 218. One or more of the first model 214, the second model 216 and the Nth model 218 in the simulator model set 212 is tuned to simulate parallel logic operations of the RTL design 202. Moreover, it is noted that in the example illustrated, the synthesis model set 204 and the simulator model set 212 share a first model (model 1), such that the first model 206 of the synthesis model set 204 and the first model 214 of the simulator model set 212 is the same model (labeled as both 206 and 214).

A third EDA program (corresponding to one of the EDA programs 54 of FIG. 1) is implemented as a formal verification EDA program that generates a formal model set 220 with N number of models. The formal model set 220 includes a first model 222, a second model 224 and an Nth model 226. At least one of the first model 222, the second model 224 and the Nth model 226 in the formal model set 220 is tuned for verifying functional operation of the RTL design 202 and/or to identify potential bugs in the RTL design 202.

The diagram 200 also includes a metrics window 230. The metrics window 230 include a first metric 232, a second metric 234 and an Nth metric 236 that each provide information characterizing performance characteristics for each model at a particular level. The first metric 232, the second metric 234 and the Nth metric 236 includes a time portion (labeled "TIME") characterizing a proof time of each model at a corresponding level and memory portion (labeled "MEMORY") characterizing a memory usage of each model at a corresponding level. Thus, the second metric 234 labeled TIME 2 and MEMORY 2 includes performance characteristics for the second model 208 of the synthesis model set 204, the second model 216 of the simulator model set 212 and the second model 224 of the formal model set 220. Moreover, for purposes of simplification of explanation, the metrics window 230 includes a metric 238 labeled "TIME 0" and "MEMORY 0" that provides performance characteristics of the RTL design 202. It is understood that the metrics included in the metrics window 230 are user configurable. That is, inclusion of a time portion and a memory portion are provided as examples of many possible different options of metrics. Such other examples include, but are not limited to model building time, and/or an evaluation operation that might be executed on a model, such as proofing time, simulation time and/or memory usage.

Figure 4:
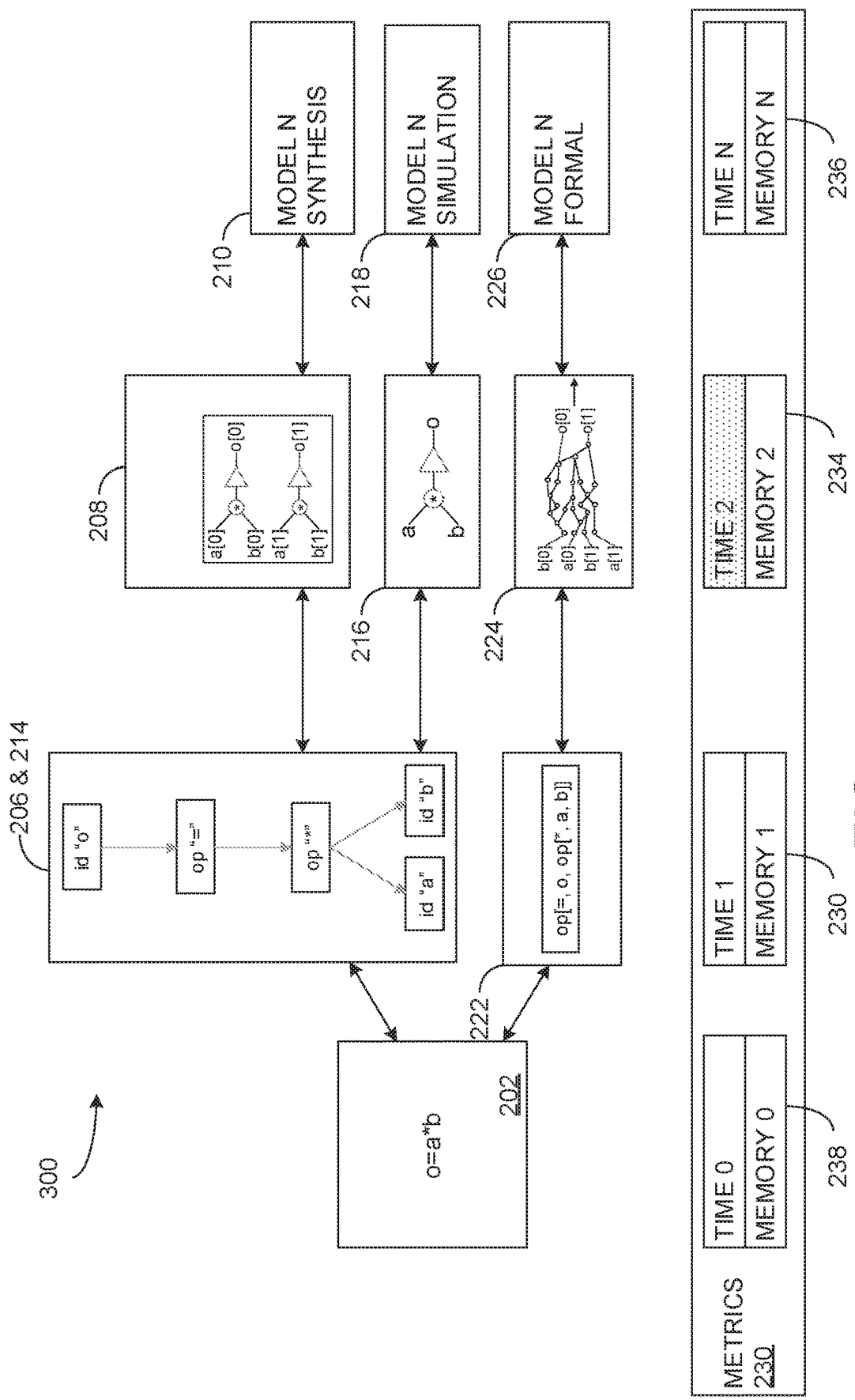
FIG. 4 illustrates a diagram of a system in a first state of a sequence of states for monitoring the impact of changes to an RTL design.

FIGS. 4-9 depict a sequence of states for the diagram 200 for tuning (e.g., optimizing) the RTL design 202 that is implemented as a multiplication operation, o=a*b. More particularly, FIG. 4 illustrates a diagram 300 in a first state of the sequence of states. In the diagram 300, the first model 206 and 210 of the synthesis model set (204 in FIG. 3) and the simulation model set (212 in FIG. 3) is implemented as a list of primitives for implementing the multiplication operation of the RTL design 202. Further, the first model 222 of the formal model set (220 in FIG. 3) is implemented as operational code for implementing the multiplication operation of the RTL design 202.

In the diagram 300, the second model 208 of the synthesis model set is implemented as an abstraction of a two-bit multiplication operation. The second model 216 of the simulation model set is implemented as an operational model that can be simulated with a software multiplication operation. The second model 224 of the formal model set is implemented as an unrolled logic operation. Furthermore, in the present example, it is presumed that the second metrics 234 of the metrics window 230 reports performance characteristics for the second model 208 of the synthesis model set that are deemed to be undesirable. Accordingly, the TIME element (e.g., proof time) of the second metrics 234 is selected, and in some examples, a goal performance metric can be provided.

It is understood that the diagrams illustrated in FIG. 4 (and other diagrams) by the second model 208 of the synthesis model set, the second model 216 of the simulation model set and/or the second model 224 of the formal model set are provided as simplified illustrative examples. In practice, the models may be more (or less) complicated from that shown and described.

Figure 5:
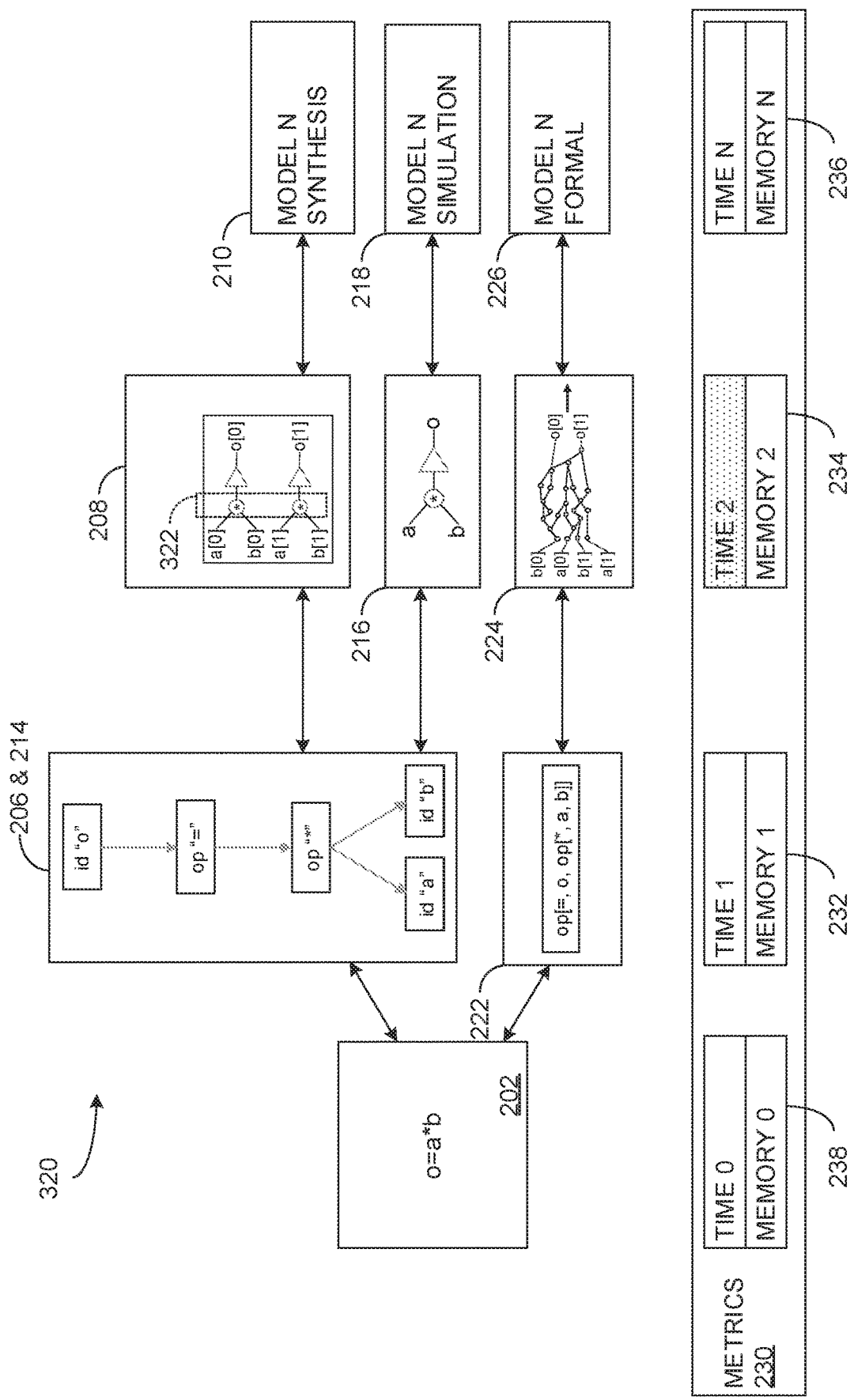
FIG. 5 illustrates a diagram of a system in a second state of the sequence of states for monitoring the impact of changes to an RTL design.

FIG. 5 illustrates a diagram 320 of a second state of the sequence of states. In the diagram 320, a structure 322 of the second model 208 of the synthesis model set has been selected, which is referred to as the selected structure 322. The selected structure 322 is potentially leading to inefficient circuit design. In some examples, the inefficiency predictor 67 of the adaptive model interface 64 of FIG. 1 is employable to identify the selected structure 322. In other examples the user viewing the diagram 320 via the GUI 59 is employable to identify the selected structure 322. In still other examples, the hardware synthesis program (e.g., an EDA program 54 of FIG. 1) employed to generate the synthesis model set that includes the second model 208 includes a user interface for selecting structures, including selection of the selected structure 322. Selection of the selected structure 322 causes the adaptive model interface 64 of FIG. 1 to execute a back propagation operation in a third state of the sequence of states.

Figure 6:
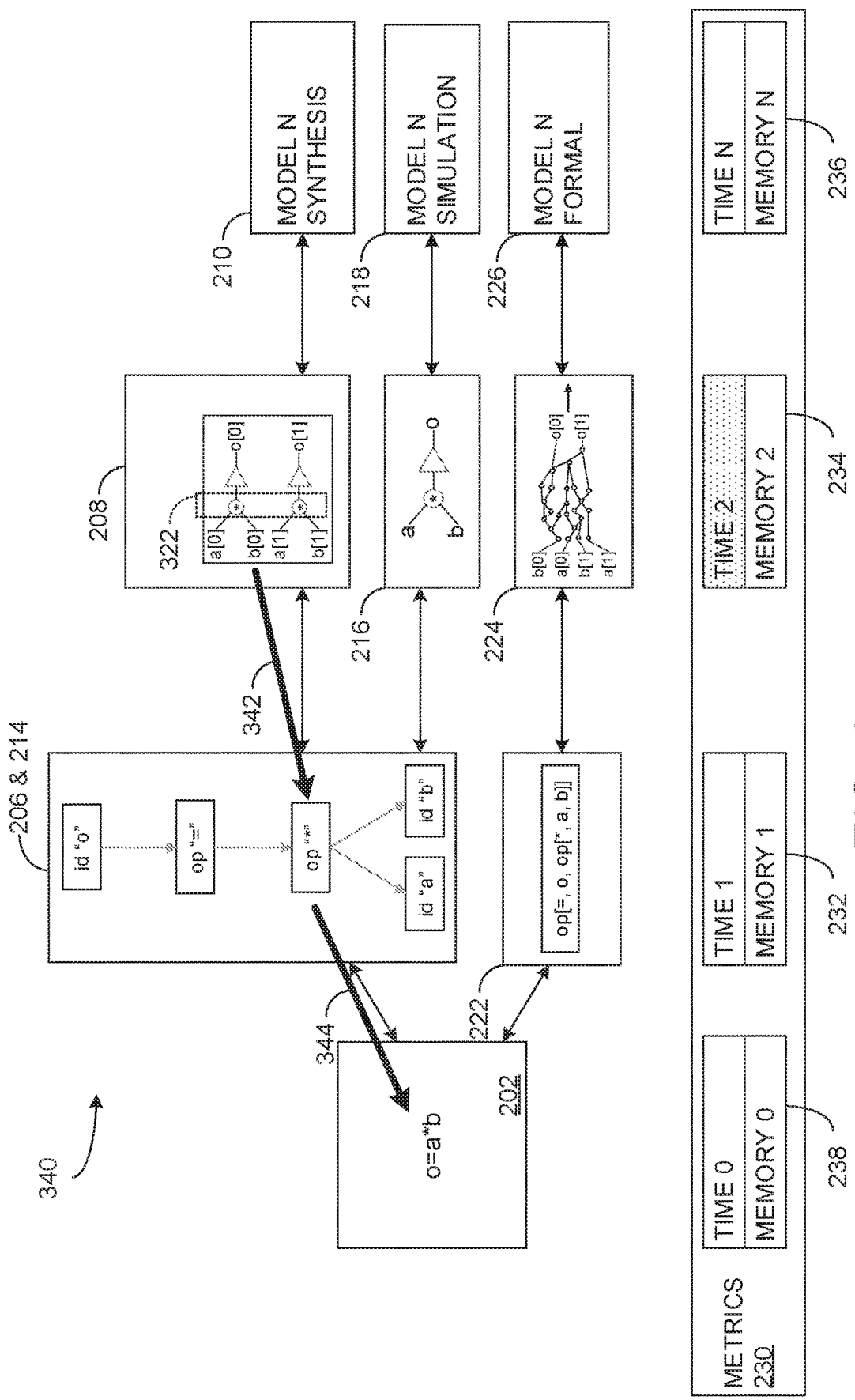
FIG. 6 illustrates a diagram of a system in a third state of the sequence of states for monitoring the impact of changes to an RTL design.

FIG. 6 illustrates a diagram 340 in the third state in the sequence of states. The diagram 340 includes back propagation arrows 342 and 344 that depict a logical flow of the back propagation operation executed by the adaptive model interface 64 of FIG. 1. In the back propagation operation, each model upstream of the second model 208 in the synthesis model set is parsed (e.g., by the adaptive model interface) to identify a root cause of the selected structure 322, namely the set of RTL operations that caused the selected structure 322. Moreover, in the back propagation operation, structures in the models intervening between the model of the selected structure 322 and the RTL design 202 that correspond to the selected structure 322 are also identified. In the present example, the back propagation identifies a structure in the first model 206 of the synthesis state models and an operation in the RTL design 202. Completion of the back propagation operation advances the sequence of states to a fourth state.

Figure 7:
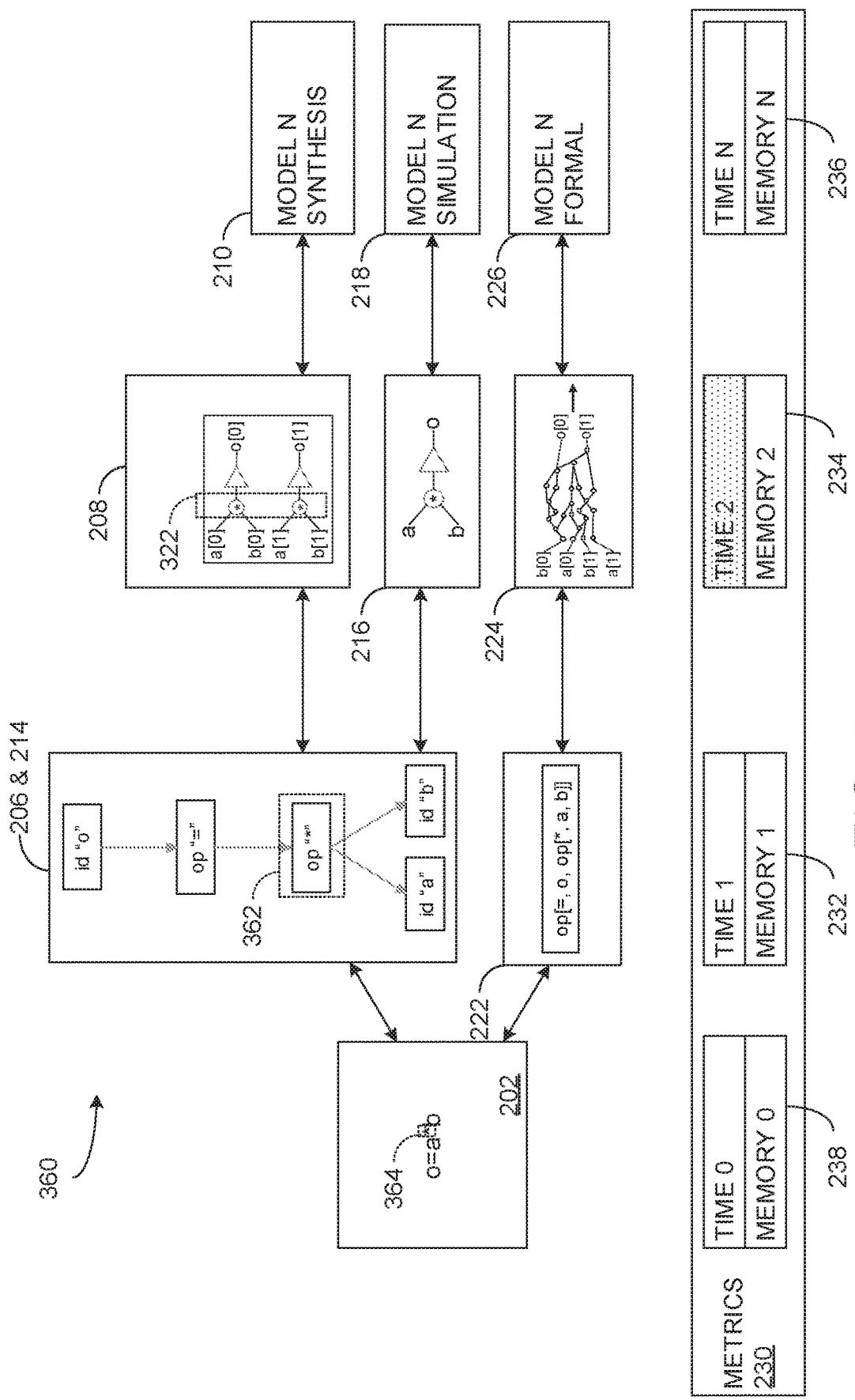
FIG. 7 illustrates a diagram of a system in a fourth state of the sequence of states for monitoring the impact of changes to an RTL design.

FIG. 7 illustrates a diagram 360 in the fourth state of the sequence of states. In the diagram 360, a structure in the first model 206 is identified as a related structure 362. The related structure 362 corresponds to the selected structure 322. Additionally, in the diagram 360, an RTL operation 364 (a multiplication operation) is identified as corresponding to the selected operation 322. Moreover, although in the present example, there is one RTL operation 364, in other examples, there could be a set of multiple RTL operations in the RTL design 202. Upon identifying the root cause of the selected structure 322 (the RTL operation 364 and the structure 362), the sequence of states advances to a fifth state.

Figure 8:
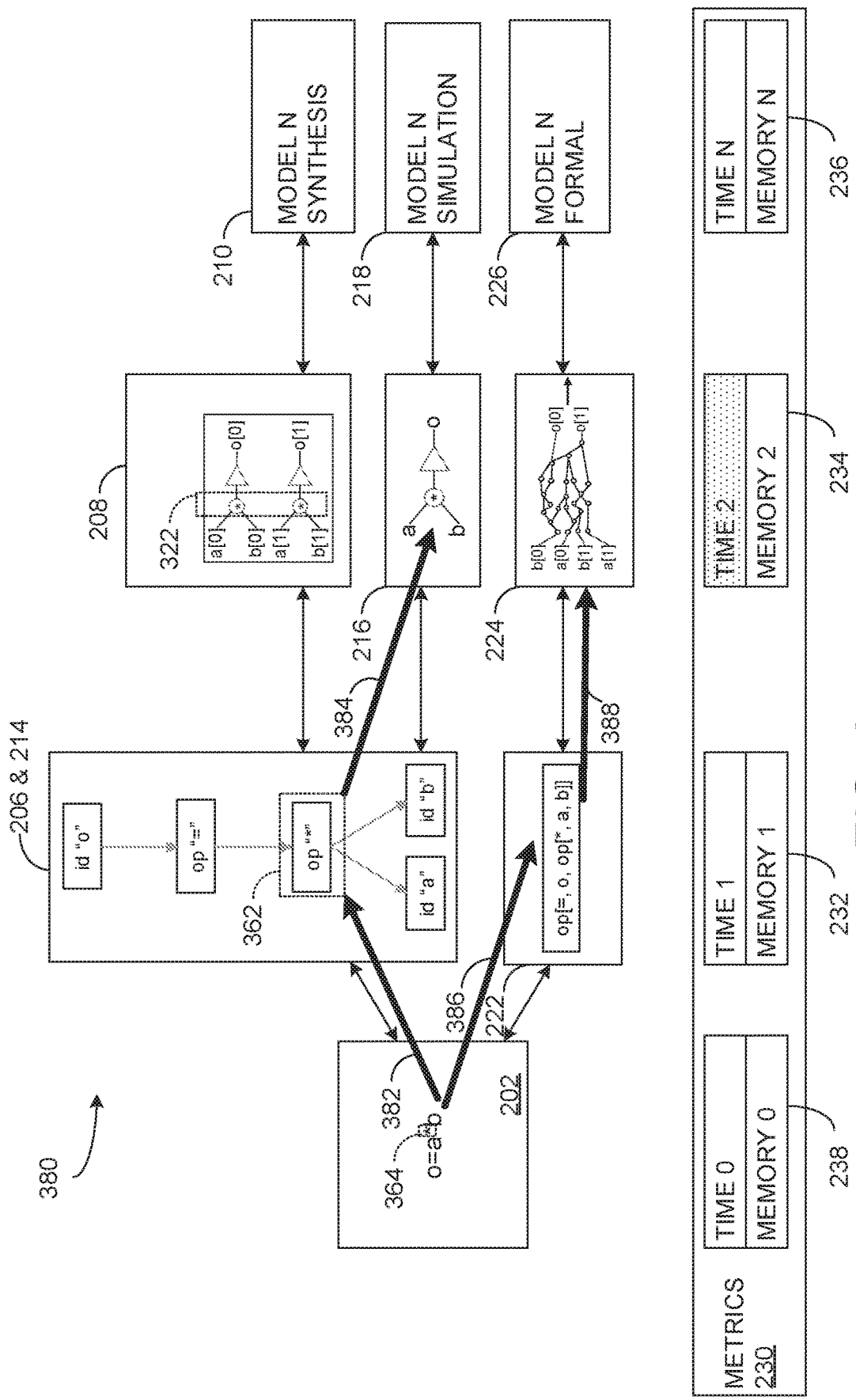
FIG. 8 illustrates a diagram of a system in a fifth state of the sequence of states for monitoring the impact of changes to an RTL design.

FIG. 8 illustrates a diagram 380 in the fifth state of the sequence of states. In the fifth state, the adaptive model interface 64 of FIG. 1 parses each model in the simulation model set and the formal model set to identify structures that represent the RTL operation 364. As indicated by the arrows 382, 384, 386 and 388, structures representing the RTL operation 364 are within the models of the simulation model set and the formal model set, and these structure are related to the selected structure 322. Such structures are referred to as related structures. Completion of the parsing advances the series of states to a sixth state.

Figure 9:
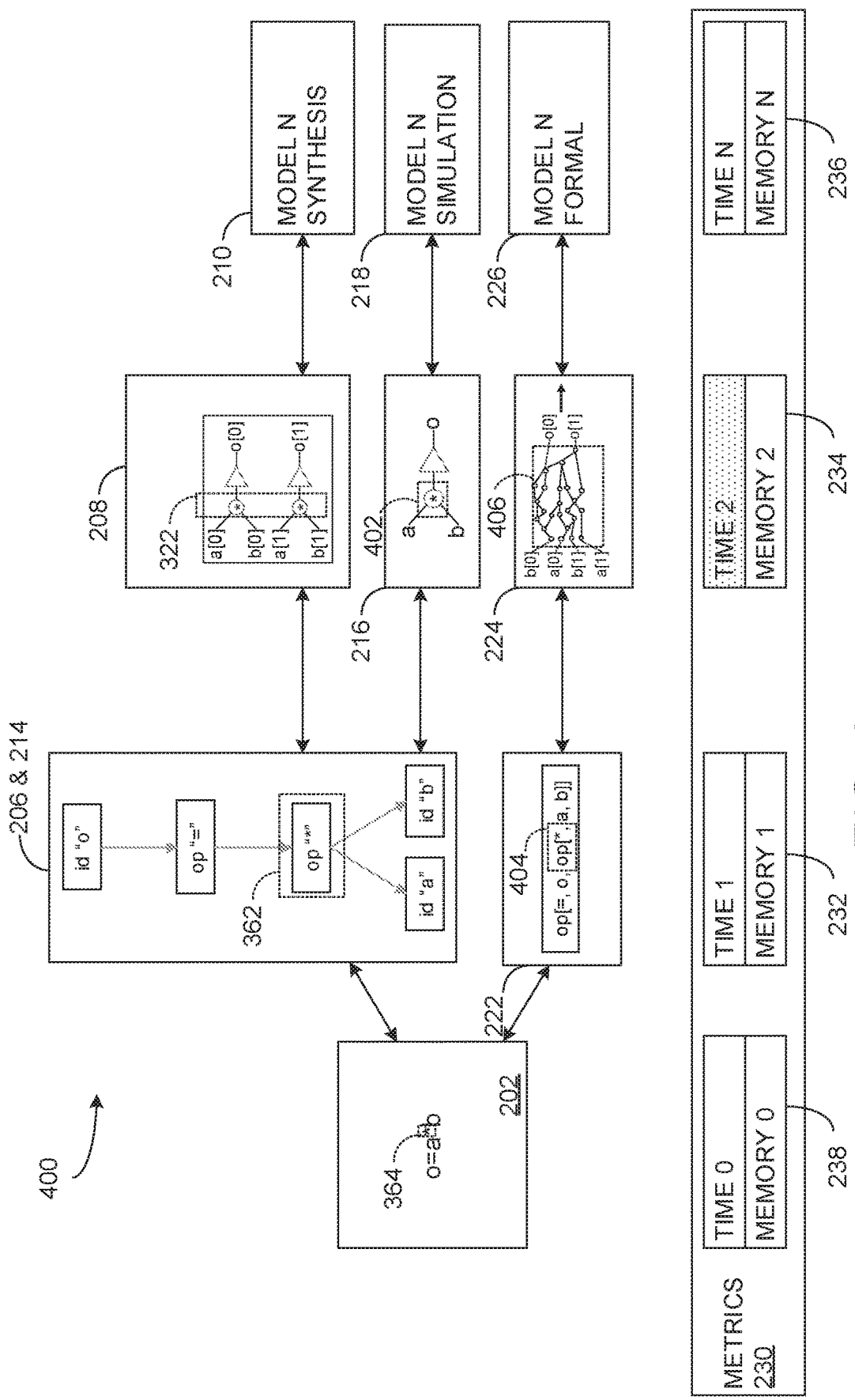
FIG. 9 illustrates a diagram of a system in a sixth state of the sequence of states for monitoring the impact of changes to an RTL design.

FIG. 9 illustrates a diagram 400 in the sixth state of the sequence of states. In the diagram 400, a structure in the first model 214 of the simulation set is identified as a related structure 362. The related structure 362 corresponds to the RTL operation 364. Additionally, in the diagram 400, a related structure 402 in the second model 216 of the simulation model set is identified. Further in the diagram 400, a related structure 404 in the first model 222 in the formal model set and a related structure 406 in the second model 224 are also identified. Upon identifying the related structures in the simulation model set and the formal model set the sequence of states advances to a seventh state.

Figure 10:
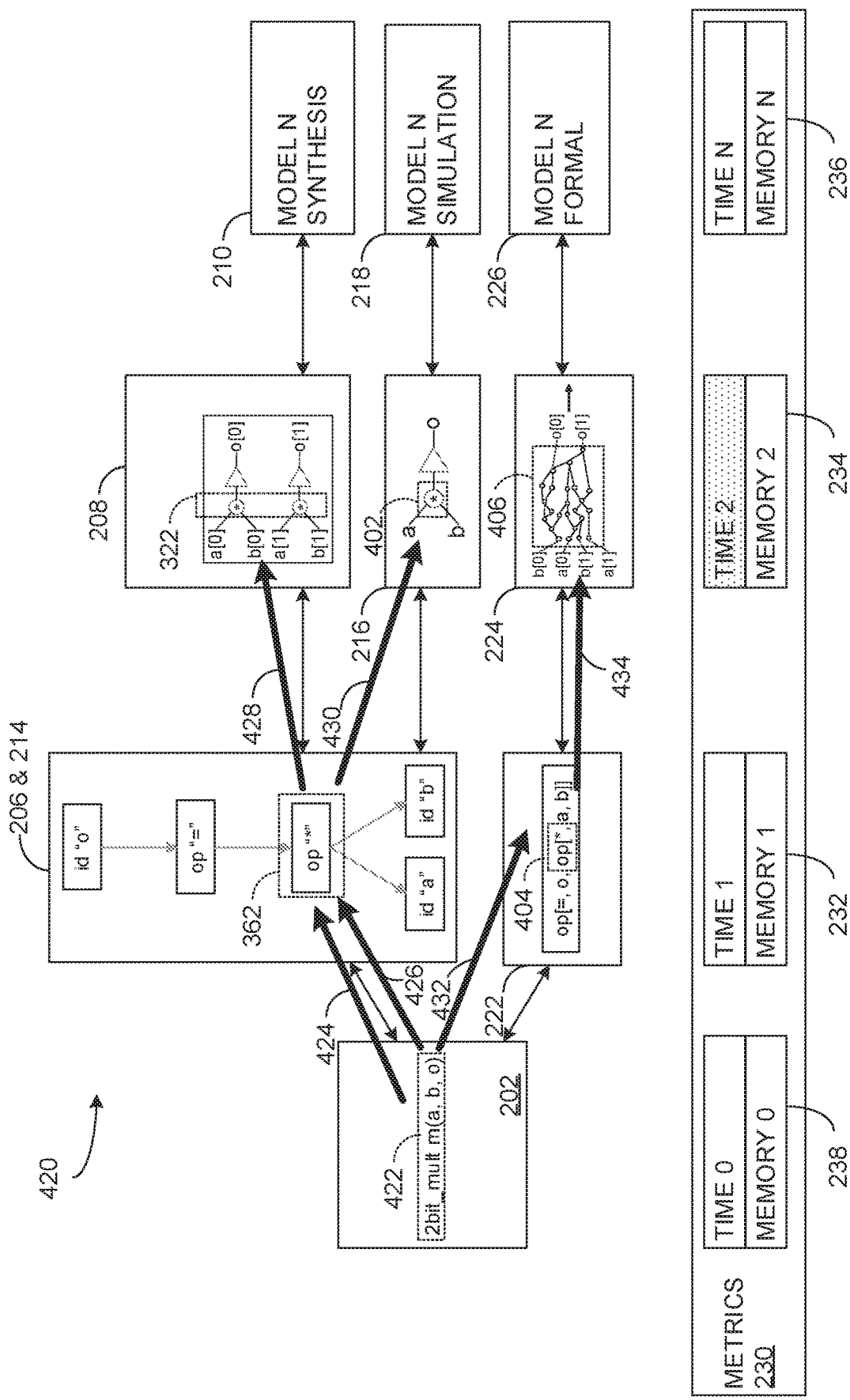
FIG. 10 illustrates a diagram of a system in a seventh state of the sequence of states for monitoring the impact of changes to an RTL design.

FIG. 10 illustrates a diagram 420 in the seventh state of the sequence of states. In the seventh state, the (current) RTL operation 364 illustrated in the diagram 400 of FIG. 9 is edited and changed to an updated RTL operation 422. In some examples, the editing can be executed with the RTL editor 60 of FIG. 1. In other examples, the RTL design 202 can be edited with one of the EDA programs 54, such as the hardware synthesis program that generated the synthesis model set.

In the present example, the previous multiplication operation is replaced with a 2 bit multiplication operation, characterized at 422. It is noted that the RTL operation 364 is functionally equivalent to the updated RLT operation 422 for the purposes of a circuit characterized by the RTL design 202. Furthermore, it is noted that the updated RTL operation 422 may not be functionally equivalent to the RTL operation 364 in other contexts (e.g., other RTL designs for different circuits). Changing of the RTL design 202 causes (i) the hardware synthesis EDA program to update the synthesis model set, (ii) the simulation EDA program to update the simulation model set and the formal verification EDA program to update the formal model set in a forward propagation operation, as indicated by arrows 424, 426, 428, 430, 432 and 434. Moreover, the adaptive model interface 64 of FIG. 1 records the changes to the RTL design 202 in the RTL log 70 of FIG. 1.

Figure 11:
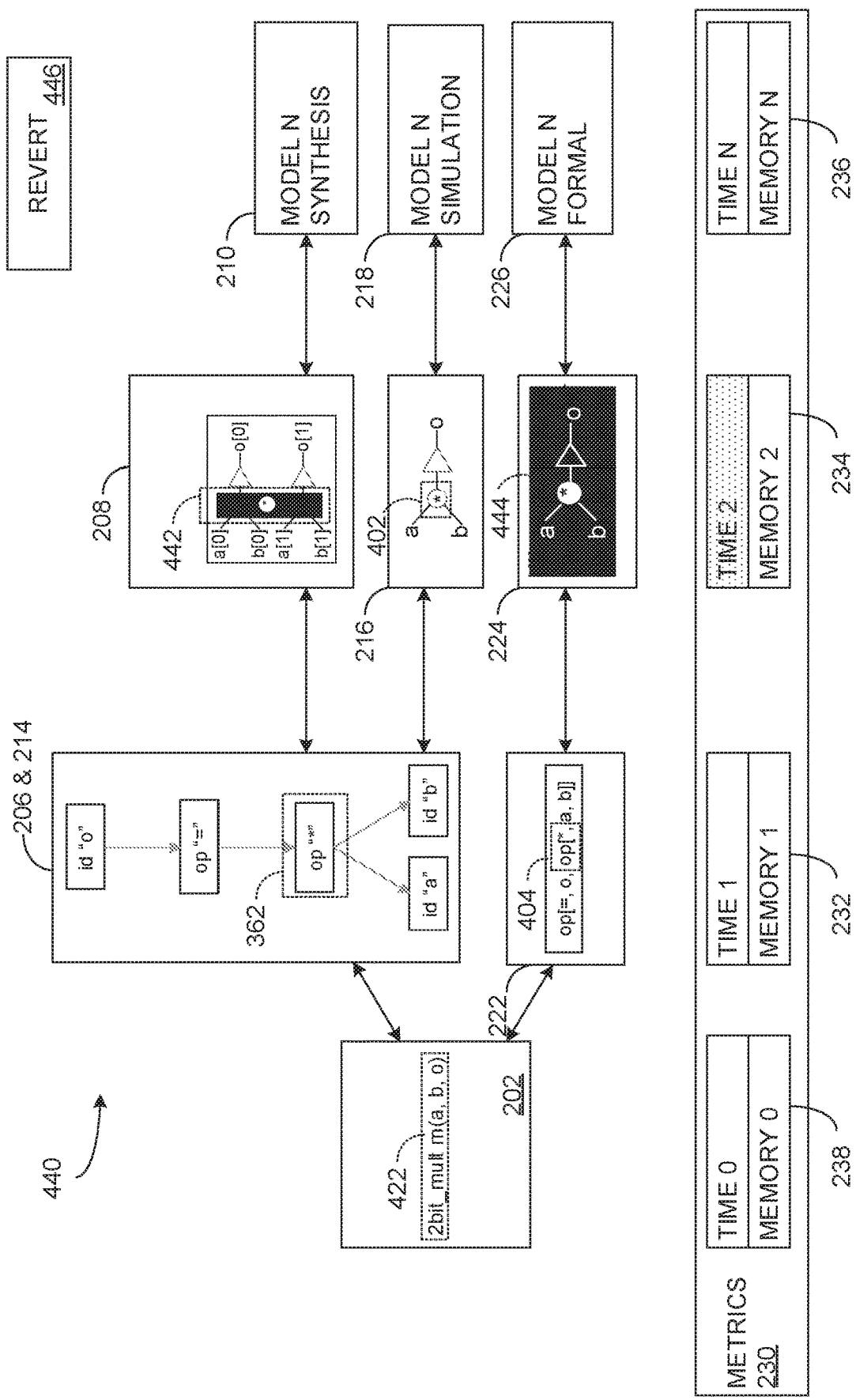
FIG. 11 illustrates a diagram of a system in an eight state of the sequence of states for monitoring the impact of changes to an RTL design.

FIG. 11 illustrates a diagram 440 in the eight state of the sequence of states. In the diagram 440, the selected structure 322 of the second model 208 in the synthesis model set is replaced with an updated structure 442. Similarly, the related structure 406 in the second model 224 of the formal model set is replaced with an updated related structure 444, namely an operational model that can be simulated with a software multiplication operation.

The metrics module 66 of FIG. 1 updates data for the metrics window 230 to reflect the updates to the synthesis model set and the formal model set. More particularly, the second metric 234 is updated to reflect the performance characteristics of the updated structure 442 and the updated related structure 444. Moreover, as illustrated, the update to the RTL design 202 did not impact the simulation model set, such that the performance characteristics for the second model 216 of the simulation model set remain unchanged.

In the present situation, if the user is satisfied with the updated performance characteristics reflected in the second metric 234, the user may decide to accept the changes and either finalize the circuit design or identify another structure in one or more of the models in the synthesized model set, the simulation model set and/or the formal model set that potentially lead to inefficient circuit design, such that a process similar to the sequence of states illustrated in FIGS. 3 to 11 can be repeated.

Alternatively, the user may decide that a performance degradation in the updated related structure 444 of the second model of the formal model set exceeds acceptable limits. As one example, since the (previous) related structure 406 employed an unrolled logic operation and the updated related structure 444 is a software abstraction of a multiplication operation, subsequent models, such as the Nth model 226 of the formal model set would need to be unrolled, thereby causing performance degradation. In such a situation, the user may elect to actuate a revert button 446. Actuation of the revert button 446 causes the adaptive model interface 64 of FIG. 1 to access the RTL log 70 and restore the RTL design 202, such as the state illustrated by the diagram 320 of FIG. 1 in a roll-back operation. In such a situation, each of the models of the synthesis model set, the simulation model set and the formal model set are also reverted to previous states in the roll-back operation.

Figure 12:
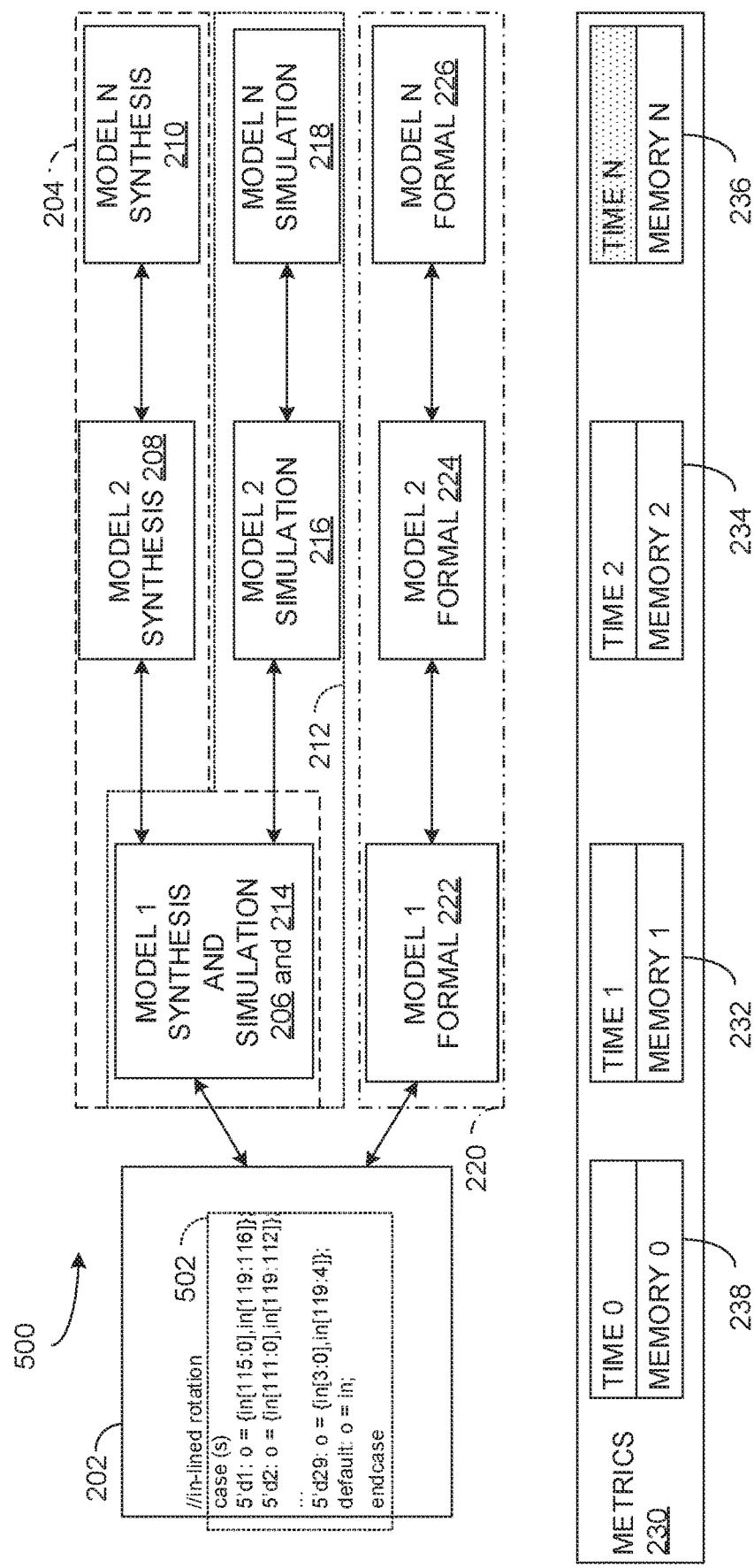
FIG. 12 illustrates a diagram of a system in a first state of another sequence of states for monitoring the impact of changes to an RTL design.
Figure 13:
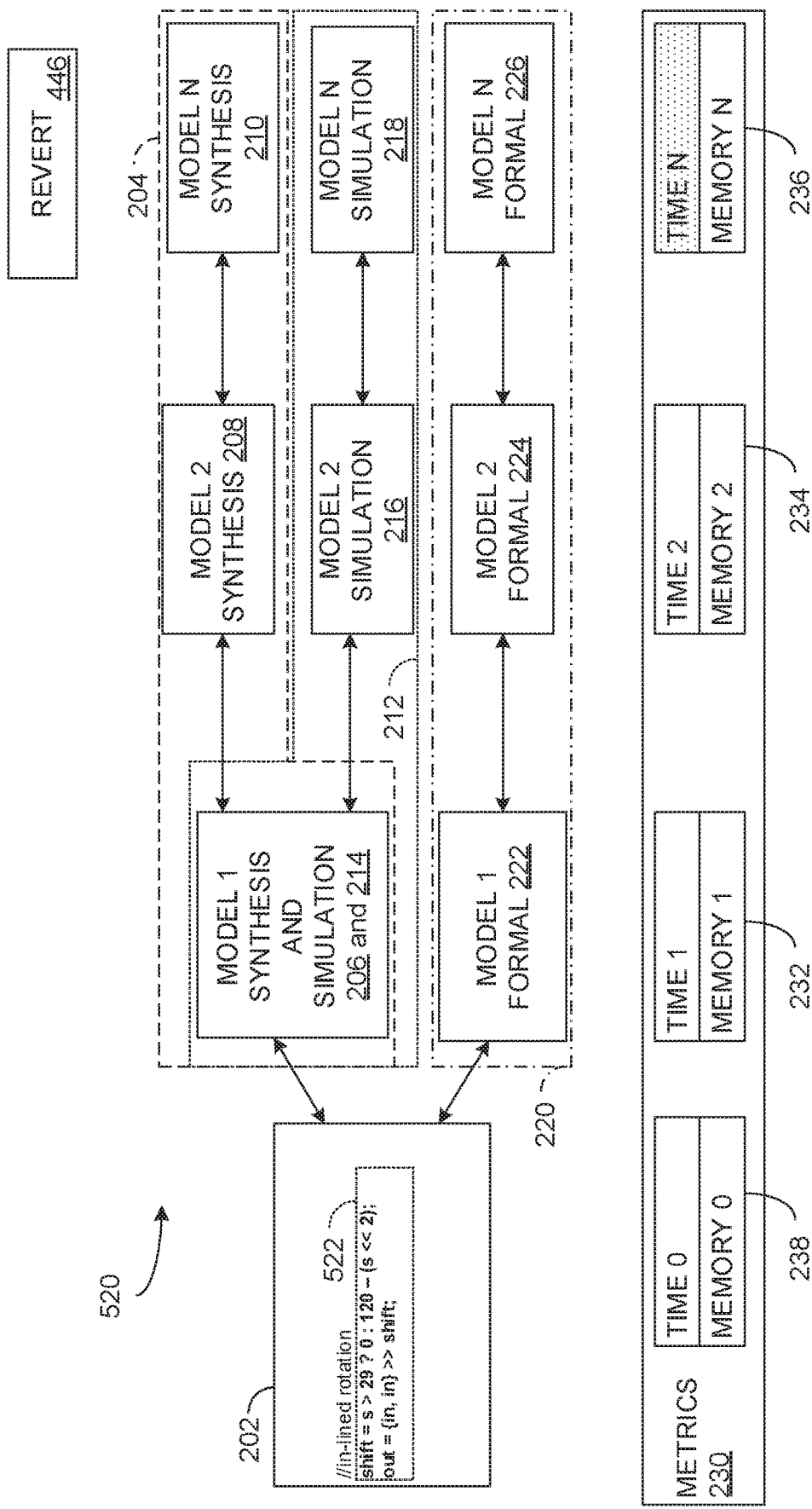
FIG. 13 illustrates a diagram of a system in a second state of the other sequence of states for monitoring the impact of changes to an RTL design.

FIGS. 12-13 depict another sequence of states for the diagram 200 of FIG. 3 for tuning (e.g., optimizing) the RTL design 202 that is implemented as a switch operation. More particularly, FIG. 12 illustrates a diagram 500 in a first state of the sequence of states. In the present example, it is presumed that the Nth metric 236 indicates that the performance characteristics of the Nth model 226 is undesirable, and is selected for tuning. In particular in the example, a goal of a lower proof time for the Nth model 226 is set. Accordingly, a structure in the Nth model 226 of the formal model set 220 is selected and a back propagation operation by the adaptive model interface 64 of FIG. 1 identifies upstream structures and the set of RTL operations corresponding the structure selected in the Nth model 226 of the formal model set 220.

In the example illustrated by diagram 500, a (current) set of RTL operations 502 defining a switch statement are identified in the back propagation operation. Moreover, the adaptive model interface 64 of FIG. 1 parses each model in the synthesis model set 204 and the simulation model set 212 for structures that correspond to the set of RTL operations 502. Upon identifying such structures, which are referred to as related structures, the sequence of states advances to a second state.

FIG. 13 illustrates a diagram 520 depicting the second state of the sequence of states. In the second state, a set of RTL operations 522 is selected as potentially leading to an inefficient circuit design. In the diagram 520 the RTL operations 522 (illustrated in FIG. 12) are replaced with an updated set of RTL operations 522. The updated set of RTL operations 522 is functionally equivalent to the previous set of RTL operations 502. In particular, the updated set of RTL operations 522 includes several shift operations that replace the switch operations.

In response to changing the RTL design 202 to include the updated set of RTL operations 522, in a forward propagation operation, the hardware synthesis EDA program, the simulation EDA program and the formal verification program update the respective synthesis model set 204, the simulation model set 212 and the formal model set 220. The metrics module 66 of FIG. 1 tracks changes in the performance characteristics due to the updating of the synthesis model set 204, the simulation model set 212 and the formal model set 220. Additionally, the adaptive model interface 64 of FIG. 1 records the changes to the RTL design 202 in the RTL log 70 to enable subsequent reversion to the first state illustrated by the diagram 500 through actuation of the revert button 446 via a roll-back operation.

In the present example, it is presumed that the shift operations in the updated set of RTL operations 522 improves the proof time ("TIME") of the Nth model 226 of the formal model set 220. Moreover, due to the nature of the change to the RTL design 202, it is presumed that the models in the synthesis model set 204 and the simulation model set 212 are not impacted. Thus, it may be desirable to keep the updated set of RTL operations 522 in the final version of the RTL design 202.

Furthermore, referring back to FIG. 3, it is understood that in some examples, it is not necessary that the back propagation operation be traced all the way back to the RTL design 202. For example, in yet another sequence of states for the diagram 200 of FIG. 3 for tuning (e.g., optimizing) a circuit design, it is presumed that the second metric 234 indicates that the performance characteristics of the second model 208 of the synthesis model set 204 is undesirable, and is selected for tuning. In this situation, it is presumed that a back propagation operation by the adaptive model interface 64 of FIG. 1 identifies upstream structures in the set of structures in the (shared) first model 206 of the synthesis model set 204 and the first simulation model 214 of the simulation model set 212 corresponding the structure selected in the second model 208 of the synthesis model set 204. In this situation, it is presumed that the adaptive model interface 64 determines that it is too computationally expensive to extend the back propagation operation back to the RTL design 202. Further, in this example, changes to the first model 206 of the synthesis model set 204 and the first model 214 of the simulation model set 212 are made.

Continuing with this example, in response to changing the (shared) first model 206 of the synthesis model set 204 and the first model 214 of the simulation model set 212 in a forward propagation operation, the hardware synthesis EDA program and the simulation EDA program update the respective synthesis model set 204 and the simulation model set 212. The metrics module 66 of FIG. 1 tracks changes in the performance characteristics due to the updating of the synthesis model set 204 and the simulation model set 212. Additionally, the adaptive model interface 64 of FIG. 1 records the changes to the first model 206 of the synthesis model set 204 and first simulation model 214 in the RTL log 70 to enable subsequent reversion to the previous state through actuation of the revert button 446 via a roll-back operation.

Referring back to FIG. 1, by employment of the system 50, the impact of changes to the RTL design 58 to each of the K number of model sets 56 can be observed directly (e.g., in the metrics window). As noted, each of the K number of EDA programs 54 can generate models for the respective model set 56 that represent the RTL design differently 58. In fact, in many situations, one model set 56 may more accurately represent a particular RTL operation than another model set 56. By employment of the system 50, the user of the model impact monitor 52 can actively track the impact of changes to the RTL design 58 on each of the resulting model sets 56. Thus, the user of the model impact monitor 52 can be informed of the impact that changing a set of RTL operations has on each model in the K sets of models 54.

In contrast to other approaches where changes to the RTL design 58 are made independently at each of the K number of EDA programs 54, by employing the system 50, situations where changes made benefit a single model set 56 at the (possibly significant) expense of another model set 56 can be curtailed. Further, in situations where such changes do negatively impact one or more model sets 56, the changes can be undone via a roll-back operation.

Figure 14:
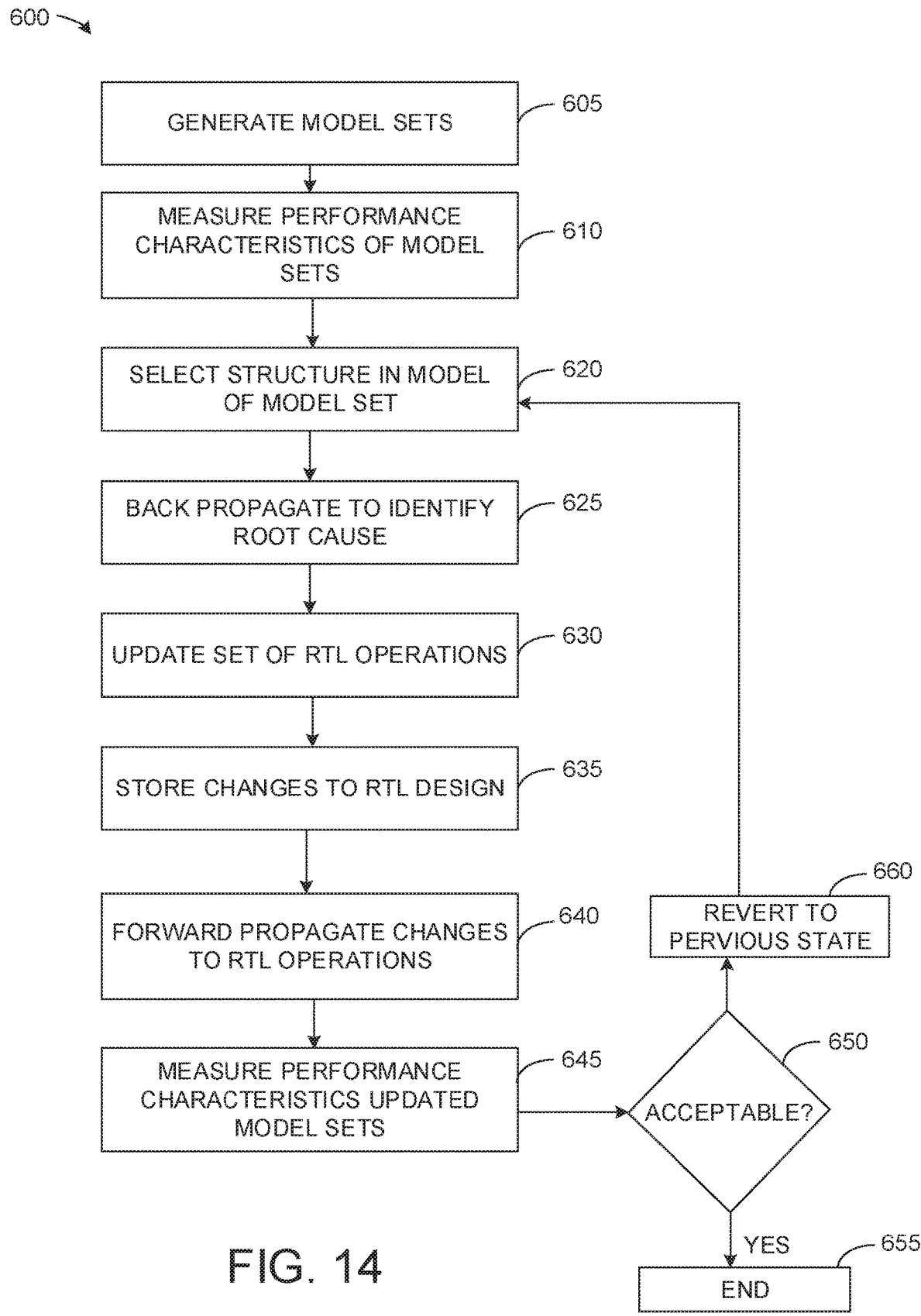
FIG. 14 illustrates a flowchart of an example method for monitoring the impact of changes to an RTL design.

In view of the foregoing structural and functional features described above, an example method will be better appreciated with reference to FIG. 14. While, for purposes of simplicity of explanation, the example methods of FIG. 14 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 14 illustrates a flowchart of an example method 600 for monitoring an impact to changes of an RTL design. The method 600 could be implemented, for example, by the system 50 of FIG. 1. At 605, each of a plurality of EDA programs (e.g., the K number of EDA programs 54 of FIG. 1) generates a respective model set for the RTL design. Each model set can include a plurality of models. At 610 an adaptive model interface (e.g., the adaptive model interface 64 of FIG. 1) measures performance characteristics of each model in each model set.

At 620, a structure in a model set of the plurality of model sets is selected (e.g., with the adaptive model interface or one of the plurality of EDA programs). The selected structure can be a structure that potentially leads to an inefficient circuit design. At 625, the adaptive model interface executes a back propagation operation to identify a root cause of the selected structure. More particularly, the back propagation operation identifies each structure in models upstream of the model of the selected structure that correspond to the selected structure and identifies a set of RTL operations that correspond to the selected structure.

At 630, the set of RTL operations are updated to provide an updated set of RTL operations that are functionally equivalent to the previous set of RTL operations. At 635, the adaptive model interface stores changes to the RTL operations for the RTL design in an RTL log (e.g., the RTL log 70 of FIG. 1). At 640, the changes to the RTL design are forwarded propagated to the model sets. More specifically, each of the EDA programs updates a respective model set to reflect the updated RTL operations.

At 645, the adaptive model interface measures performance characteristics of the updated model sets and these performance characteristics can be output. At 650, a determination is made as to whether the performance characteristics are acceptable. If the determination at 650 is positive (e.g., YES), the method proceeds to 655, where the method 600 ends. If the determination at 650 is negative (e.g., NO), the method 600 proceeds to 660. At 660, the adaptive model interface reverts the RTL design back to a previous state, such that the model sets are also reverted to previous states and the method 600 returns to 620.

Figure 15:
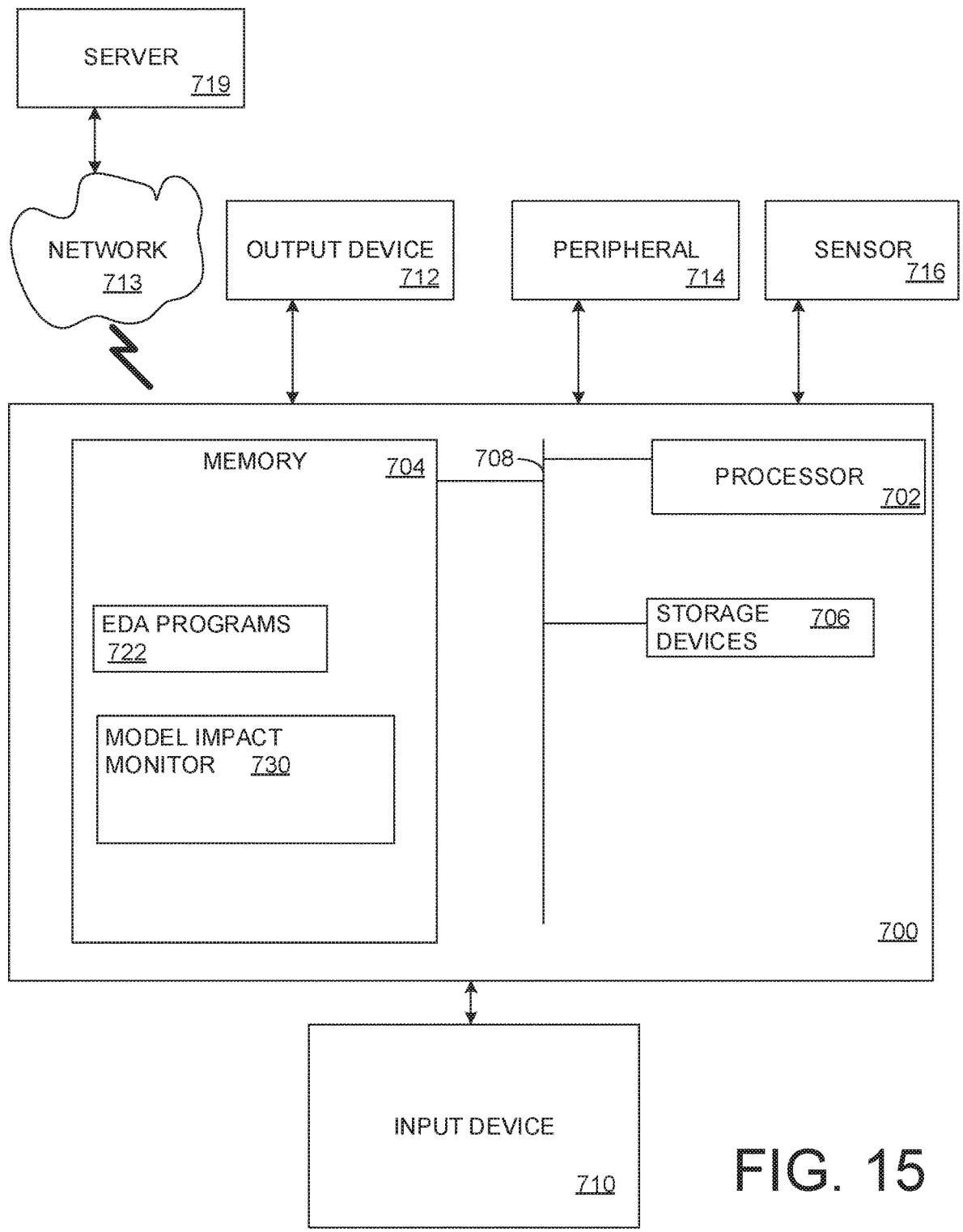
FIG. 15 illustrates an example of a computing system employable to monitoring the impact of changes to an RTL design.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 15, the computing system 700 can include a computer processor 702, associated memory 704 (e.g., random access memory (RAM), cache memory, flash memory, etc.), one or more storage devices 706 (e.g., a solid state drive, a hard disk drive, an optical drive such as a compact disk (CD) drive or digital versatile disk (DVD) drive, a flash memory stick, etc.) and numerous other elements and functionalities. The computer processor 702 may be an integrated circuit for processing instructions. For example, the computer processor may be one or more cores, or micro-cores of a processor. Components of the computing system 700 can communicate over a data bus 708.

The computing system 700 may also include an input device 710, such as any combination of one or more of a touchscreen, keyboard, mouse, microphone, touchpad, electronic pen, or any other input device. Further, the computing system 700 can include an output device 712, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 712 can be the same physical device as the input device 710. In other examples, the output device 712 and the input device 710 can be implemented as separate physical devices. The computing system 700 can be connected to a network 713 (e.g., a local area network (LAN), a wide area network (WAN) such as the Internet, mobile network, or any other type of network) via a network interface connection (not shown). The input device 710 and output device(s) 712 can be connected locally and/or remotely (e.g., via the network 713) to the computer processor 702, the memory 704 and/or the storage device 706. Many different types of computing systems exist, and the aforementioned input device 710 and the output device 712 can take other forms. The computing system 700 can further include a peripheral 714 and a sensor 716 for interacting with the environment of the computing system 700 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 700 can communicate with a server 719 via the network 713.

The memory 704 can include a plurality of EDA programs 722 that can be employed to generate different model sets for an RTL design. The memory 704 can also include a model impact monitor 730. The model impact monitor 730 can be employed to monitor the impact that changes to the RTL design have on performance characteristics of the different model sets generated by the EDA programs 722.

Further, one or more elements of the aforementioned computing system 700 can be located at a remote location and connected to the other elements over a network 713. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine readable instructions, the machine readable instructions comprising a model impact monitor, the model impact monitor comprising:
   an electronic design automation (EDA) manager that communicates with a plurality of EDA programs, wherein each EDA program generates a model set for a register-transfer level (RTL) design comprising a list of RTL operations;
   an adaptive model interface that records changes to RTL operations in the list of RTL operations of the RTL design and measures a change in performance characteristics of each of the model sets generated by the plurality of EDA programs based on a respective one of the changes in the RTL operations of the RTL design.

2. The medium of claim 1, wherein the adaptive model interface further comprises an inefficiency predictor that identifies a selectable structure in a given model generated by at a given EDA program of the plurality of EDA program that potentially leads to an inefficient circuit design, and the structure is selected in at least one of a user interface of the model impact monitor and a user interface of the given EDA program.

3. The medium of claim 2, wherein the adaptive model interface identifies a set of RTL operations in the RTL design that correspond to the selected structures of the given model in a back propagation operation.

4. The medium of claim 3, wherein the adaptive model interface identifies one or more model structures in the model set generated by each of the other plurality of EDA programs that corresponds to the set of RTL operations in the RTL design that correspond to the selected structure of the given model.

5. The medium of claim 4, wherein the model impact monitor further comprises:
an RTL editor that provides an interface for editing the RTL design, wherein the RTL editor changes the set of RTL operations in the RTL design that correspond to the selected structure to an updated set of RTL operations, and each of the plurality of EDA programs updates respective generated model sets based on the updated the set of RTL operations.

6. The medium of claim 5, wherein the adaptive model interface identifies structures in each of the plurality of updated model sets generated by the plurality of EDA programs that correspond to the updated set of RTL operations.

7. The medium of claim 6, wherein the adaptive model interface further comprises a metrics module that measures a change in a proof time and a memory usage in each updated model set generated by the plurality of EDA programs in response to the updated set of RTL operations.

8. The medium of claim 6, wherein the user interface provides a selectable element for reverting to a pervious set of RTL operations from the updated set of RTL operations.

9. The medium of claim 1, wherein the model impact monitor further comprises:
an RTL editor that provides an interface for editing the RTL design;
wherein the adaptive model interface further comprises an alternate operation table that provides an alternate RTL operation in response to selection of a given RTL operation in the RTL design in the RTL editor, wherein the alternate RTL operation is functionally equivalent to the given RTL operation.

10. The medium of claim 1, wherein the plurality of EDA programs comprise:
a hardware synthesis program that generates a first model set of the RTL design, wherein the first model set defines logic elements for the RTL operations in the list of RTL operations of the RTL design;
a simulator program that generates a second model set of the RTL design, wherein the second model set is tuned to simulate parallel logic operations in the RTL design; and
a formal verification program that generates a third model set for the RTL design, wherein the second model set is tuned for identifying potential bugs in the RTL design.

11. The medium of claim 10, wherein a given RTL operation of the RTL design is represented differently in the first model set, the second model set and the third model set.

12. A method comprising:
generating, by each of a plurality of electronic design automation (EDA) programs with a register-transfer level (RTL) design comprising a list of RTL operations, a respective model set for the RTL design;
selecting a structure in a given model of a given model set generated by a given EDA program of the plurality of EDA programs that potentially leads to an inefficient circuit design;
identifying a current set of RTL operations in the RTL design that corresponds to the selected structure;
changing the current set of RTL operations to an updated set of RTL operations;
providing the plurality of programs with the RTL design comprising the updated set of RTL operations, wherein each EDA program generates an updated model set for the RTL design; and
measuring performance characteristics of each of the updated model set for the RTL design to determine an impact of the changing from the current set of RTL operations to the updated set of RTL operations.

13. The method of claim 12, wherein the current set of RTL operations and the updated set of RTL operations are functionally equivalent for the purposes of a circuit characterized by the RTL design.

14. The method of claim 13, wherein the plurality of EDA programs comprise:
a hardware synthesis program that generates a first model set of the RTL design, wherein the first model set defines logic elements for the list of RTL operations of the RTL design;
a simulator program that generates a second model set of the RTL design, wherein the second model set is tuned to simulate parallel logic operations in the RTL design; and
a formal verification program that generates a third model set for the RTL design, wherein the second model set is tuned for identifying potential bugs in the RTL design.

15. The method of claim 14, wherein each of the first model set, the second model set and the third model set represent the current set of operations of the RTL design and the updated set of operations of the RTL design differently.

16. The method of claim 15, wherein the measuring further comprises measuring a change in a proof time and a memory usage in each of the first model set, the second model set and the third model set generated in response to the updated set of RTL operations.

17. The method of claim 12, further comprising identifying a structure in each of the other model sets that corresponds to the structure model in the given model set.

18. The method of claim 12, further comprising outputting a plurality of sets of RTL operations that are functionally equivalent to the current set of RTL operations.

19. A system comprising:
a non-transitory memory to store machine readable instructions; and
a processor to access the memory and execute the machine readable instructions, the machine readable instructions comprising:
a plurality of electronic design automation (EDA) programs, wherein each EDA program generates a model set for a register-transfer level (RTL) design comprising a list of RTL operations and each model set generated by a respective one of the plurality of EDA programs represent RTL operations in the list of RTL operations of the RTL design differently;

an EDA manager that communicates with the plurality of EDA programs;

an adaptive model interface that records changes to one or more of the RTL operations in the list of RTL operations of the RTL design and a given model in the model sets and measures a change in performance characteristics of each of the model sets based on updates to the model sets generated by the plurality of EDA programs that are made in response to either a respective one of the changes in the RTL operations of the RTL design.

20. The system of claim 19, the machine readable instructions comprising an RTL editor that provides an interface for editing the RTL design.

\* \* \* \* \*